United States Patent [19]

Martin

[11] Patent Number: 5,497,684
[45] Date of Patent: Mar. 12, 1996

[54] METHOD FOR REDUCING THE KERF WIDTH MADE BY A CIRCULAR SAW BLADE

[76] Inventor: Richard R. Martin, 29, rue des Pins, Clair, NB Canada E7A 2E6

[21] Appl. No.: 199,575

[22] Filed: Feb. 22, 1994

[51] Int. Cl.$^6$ .................................................. B27B 5/00
[52] U.S. Cl. .................................. 83/13; 83/169; 83/821; 83/824; 83/827; 83/829
[58] Field of Search ................................ 83/13, 168, 169, 83/820, 821, 824, 827, 828, 829

[56] References Cited

U.S. PATENT DOCUMENTS

| | | | |
|---|---|---|---|
| 3,674,065 | 7/1972 | Fairfield, Jr. et al. | 83/169 X |
| 3,688,820 | 9/1972 | Lundblom | 83/829 X |
| 3,703,915 | 11/1972 | Pearson | 83/824 |
| 3,772,956 | 11/1973 | McMillan | 83/827 |
| 3,961,548 | 6/1976 | Claassen | 83/169 |
| 4,033,319 | 7/1977 | Winter | 83/828 X |
| 4,195,543 | 4/1980 | Tapply et al. | 83/820 X |
| 4,599,929 | 7/1986 | Dutina | 83/821 |
| 4,635,513 | 1/1987 | McGeehee | 83/821 X |
| 4,660,448 | 4/1987 | Bies | 83/13 |
| 4,854,207 | 8/1989 | Kirbach et al. | 83/828 X |
| 5,213,020 | 5/1993 | Pleau et al. | 83/828 |
| 5,284,407 | 2/1994 | Wawrzyniak | 83/169 X |

FOREIGN PATENT DOCUMENTS

| | | |
|---|---|---|
| 832263 | 1/1970 | Canada. |
| 849310 | 8/1970 | Canada. |
| 870393 | 5/1971 | Canada. |
| 906374 | 8/1972 | Canada. |
| 1183428 | 3/1985 | Canada. |

OTHER PUBLICATIONS

Catalogue Pacific/Hoe, p. 8, "Floating Guide Systems" 3 pages of Purchasing Document Showing a Disclosed Date of Above Floating Guide System.

*Primary Examiner*—Rinaldi I. Rada
*Assistant Examiner*—Clark F. Dexter

[57] ABSTRACT

A guiding system for large circular saws wherein the guiding pads are positioned according to a typical angular wavelength of a circumferential vibration wave of the saw blade when rotating at an operating speed. In one embodiment, the frequency of a natural circumferential vibration wave is measured before positioning the guiding pads. Two sets of guiding pads are spaced apart a distance equal to about half the angular wavelength of such natural vibration wave. This distance corresponds to an angular distance between two successive opposite peaks or crests of a sinusoidal wave in the saw blade. The consequence of two successive opposite peaks entering the guiding pads at the same time has the effect of dampening the vibration very quickly, by acting upon both sides of the blade simultaneously to reduce the amp amplitude of the wave, while maintaining balanced axial impact on the saw. The guiding pads are further positioned in a true co-planar relationship with the saw blade by means of two superimposed three-point levellers, on the pad supporting members.

4 Claims, 7 Drawing Sheets

5,497,684

1

METHOD FOR REDUCING THE KERF WIDTH MADE BY A CIRCULAR SAW BLADE

FIELD OF INVENTION

This invention relates to the guiding of large circular saws for saw mills, and more particularly to a guiding system in which guiding pads are positioned according to a typical wavelength of a vibration of the saw.

BACKGROUND OF THE INVENTION conventional log saws and especially hardwood saws of about 48" to 54" in diameter are made of circular high strength steel plate having a thickness of 6 AWG (0.194") at the centre, and 7 AWG (0.179") at the rim. A "welded on" or "interchangeable" tooth on these saws has a typical width of 0.312". Accordingly, and adding normal wobbling of the saw, a width of cut, or the kerf of a saw, of between 0.450" to 0.480" was considered satisfactory.

During the last few years, substantial efforts have been made to reduce the kerf of a saw, as a means to recover more lumber from every log. Thin saws having a throughout plate thickness of 8 AWG, (0.164"), and a tooth width of 0.261" have been introduced to the industry. However, without a good guiding system the thin-kerf saw is easier deflected, and the width of cut remains unchanged.

One example of a guiding system for thin-kerf saws is found in the disclosure of U.S. Pat. No. 5,213,020 issued May 25, 1993 to Pleau et al. This guiding system is used on large head saws which are held at a fixed location on a driving mandrel. The guiding system uses three sets of wear plugs mounted on a "C"-block at the in-feed side of the saw. Each set of wear plugs consists of two cylindrical blocks facing one another and each being at a specific clearance from a respective side of the saw plate. Further-more, two sets of wear plugs are spaced apart circumferentially a distance equal to a length of one gullet plus one tooth width. A third set of wear plugs is placed radially inwardly to the top first set at about ⅓ of the distance from a tooth gullet to the centre of the blade. This guiding system is used to maintain a proper alignment of the saw during sawing and to prevent buckling near a gullet of a tooth.

Another arrangement which belongs to the state of the art is known in the trade as a Floating Guide System. An example of this Floating Guide System may be found in the 1993 Catalogue of Pacific/Hoe, located in Portland, Oreg., U.S.A. Such Floating Guide System is on sale to the sawmill industry since at least October 1990. The guide system is used on either a fixed head saw or on a saw which floats axially on a driving mandrel.

The Floating Guide System uses 3 sets of grill pads. Each set consists of two pads, facing one another, and at a specific clearance from a respective side of the saw plate. Two arm members, at the in-feed side of the saw and each projecting inwardly parallel to a respective side of the saw maintain the two in-feed sets of pads at a distance of 20" from one another, and at a same radial distance from the centre of the saw. A third set of pads is similarly mounted at the out-feed side of the saw, below the line of cut, and at the same radial distance as the in-feed pads. This 20" spacing of the in-feed pads is intended to increase a span between integral supporting surfaces to prevent a slanting of the saw.

It has been found by experience that despite the previously taught spacings for the in-feed guide pads, the width of cut is not always reduced significantly.

2

Another problem with prior art guide systems is related to the lubrication of guide pads. It has been a common practice to introduce lubricant between the pad and the saw blade, through an opening at the centre of the pad. As the blade turns, the lubricant is inevitably carried to the out-feed side of the pad, resulting in an uneven distribution of the lubricant and in a premature wear on the leading side of the pad. Such uneven wear causes uneven pad contact with the saw, and a consequential loss of efficiency of the guiding system. An example of such lubrication system is disclosed in Canadian Patent No. 870,393, issued May 11, 1971 to Fairfield et al.

A similar problem of uneven pad contact with prior art systems is caused by a lack of adjustment on the guiding pads. Such devices are not always mounted under ideal working conditions. The installation often requires welding to working or bent structural members, or bolting into oversized holes or on rough surfaces. Hence, the pads are not always in perfect alignment with the saw, and a performance of the guide system is likewise reduced.

SUMMARY OF THE INVENTION

The behaviour of a rotating circular saw is comparable to the behaviour of any flat or elongated body having a mass and elastic properties; it responds to impact by dissipating a stress wave throughout its mass. A circular saw can be compared to a steel flat bar where such a stress wave takes the form of a continuous sinusoidal wave through the entire length of the bar. Accordingly, an impact on the side of a circular saw from a knot, from a direction of wood grain, or from a side entering into a log, will set a sinusoidal wave around the circumference of the saw blade. Such wave will have an angular wavelength and an axial amplitude much like the illustrations given in FIG. 3 and FIG. 4.

This undulating motion explains the lateral displacement of the teeth and an enlargement of the cut irregardless of a clearance between the pads of prior art alignment guides or cant guides.

A sinusoidal wave is inherent to the dimensions of the saw, to its natural frequency, and to its rotational speed. Thereupon, it has been found that hardwood saws, having a blade thickness of 8 AWG and a diameter of 48" to 54", and turning at a speed of 750 RPM, vibrate at a rate of 6 to 7 angular wavelengths per turn when rotating freely. This natural vibration is reduced slightly, to 5 angular wavelengths per turn, when under tension from cutting through a log.

In view of the foregoing, it can be understood that a peak, or a crest of a wave entering the gap of a single pad guiding system will produce the same effect as the same wave entering an oblique knot in a log; a new impact will be forced upon and a superposed vibration will be set. Similarly, if two subsequent pads are not spaced properly, such wave entering the guiding pads in succession has the adverse effect of increasing the amplitude of the vibration, and thus causing more deviation than guiding.

According to one aspect of this invention however, a natural vibration of a saw is measured before installation of a guiding system. A pair of in-feed pads are spaced to match a distance of half an angular wavelength of such natural vibration. This corresponds to a distance between two successive opposite peaks or crests of the sinusoidal wave.

The consequence of two successive opposite peaks entering guiding pads at the same time has the effect of dampening the vibration very quickly, by acting upon both sides of the saw simultaneously, to reduce the amplitude of the wave, while maintaining balanced axial impact on the saw.

A typical peak-to-peak guiding system installed on a 48" saw having a tooth width of about 0.261" has consistently given a width of cut of about 0.283". The lumber recovery when using the present invention is thereby substantial greater than a machine using a prior art guide system giving a width of cut of 0.450" to 0.480".

In accordance with another aspect of the present invention, having a lubrication system, the placement of a lubricating hole at the leading side of the guide pad improves the spreading of the lubricant over a larger surface of the pad contacting the saw. It has been found by experience that the movement of the saw on a leading side fed pad spreads lubricant over 55–60% of the pad surface, as compared to 20–25% for a centre fed pad. This increase in coverage reduces uneven pad wear experienced with conventional guiding system, and thereby prolongs the efficient operation of the guiding system between pad changes.

A further aspect of the present invention consists of a multi-dimensional adjustment on every guide pad. A 3 point leveller is incorporated within the mounting base of the pad holding arms, to adjust and tilt the pad holding arms in 3 directions relative to a plane of the saw. Each pad is further mounted on a 3 point leveller which provides the means to incline the plane of the pad in spacial relationship to the plane of the saw.

The adjustment system provides the means to effect a perfect alignment of every pad despite a defective or imperfect installation of the guide system's mounting bases.

It is obvious that further improvements to saw guiding systems can be obtained if the structures described in the above embodiments are combined or added to each other.

BRIEF DESCRIPTION OF THE DRAWINGS

Other advantages of the invention will be apparent from the following description of a preferred embodiment illustrated in the accompanying drawings, in which.

DETAILED DESCRIPTION OF PREFERRED EMBODIMENT

Figure 1:
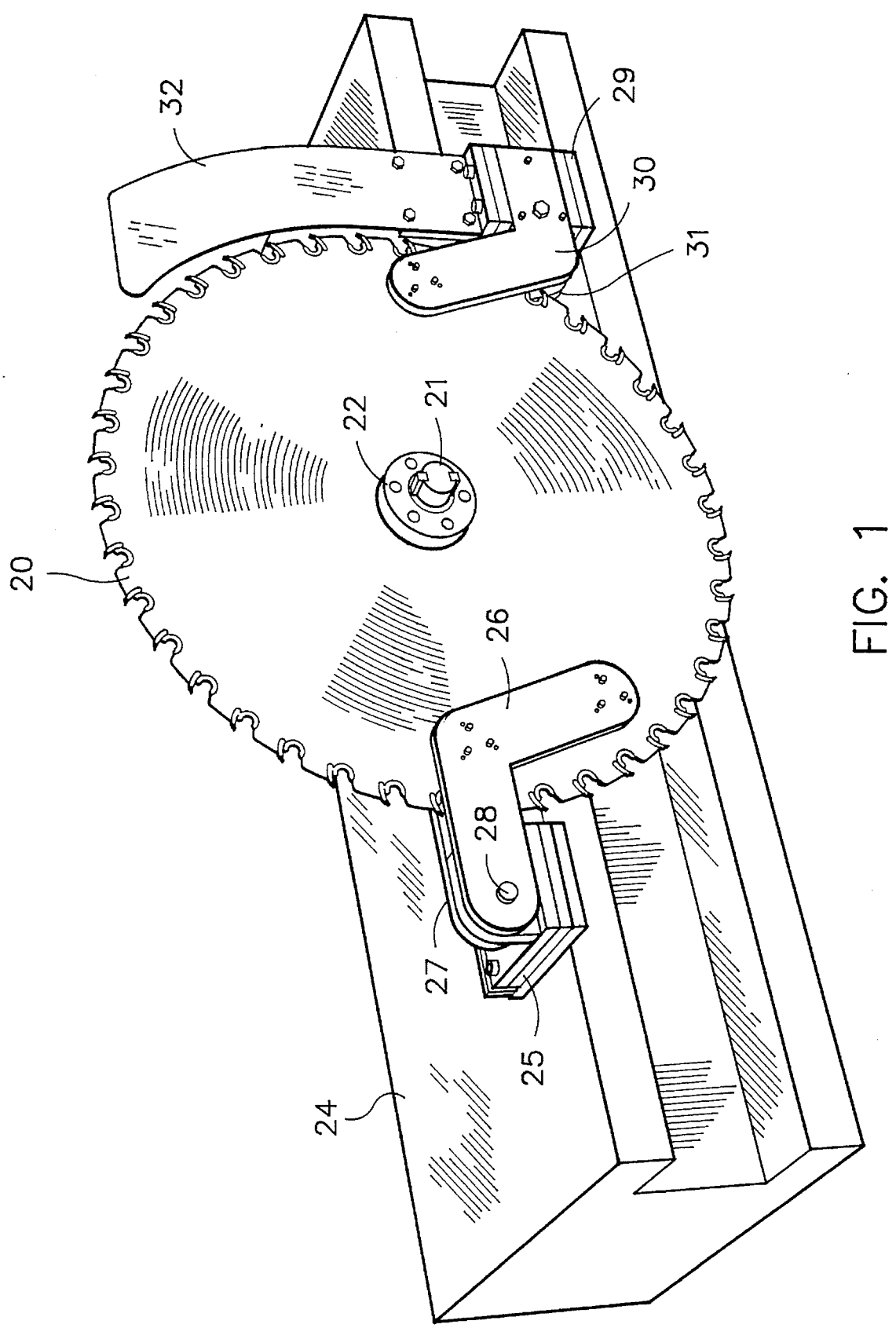
FIG. 1 is a perspective view of a preferred embodiment showing a circular saw and a guiding system comprising three pairs of guiding pads.

A preferred embodiment of the invention is illustrated on FIG. 1. A typical log sawing mill consists of a large circular saw 20, rotatably driven by an electric motor or an engine through a shaft 21. The saw 20 is normally mounted on a floating collar 22, and is free to float axially on the driving shaft 21. The shaft 21 is mounted on bearings on a rigid base 24. The rigid base 24 is located alongside a carriage and track assembly where the log travels back and forth and gets sawn at every forward pass.

A preferred embodiment for a guiding system for large circular saws, and especially for thin kerf saws, comprises a front base 25 supporting a front right arm 26 and a front left arm 27 by means of a pivot pin 28. The front direction of the saw is defined by the in-feed edge of the saw 20. Similarly, a right side and a left side of the saw is defined by facing a direction of travel of the log while being sawn. The guiding system also comprises a rear base 29 supporting a rear right arm 30, a rear left arm 31 and a vertical blade, commonly known in the trade as a splitter blade 32. The splitter blade 32 assists in the separation of a piece of lumber from the remaining log, once the log gets passed the saw.

Figure 2:
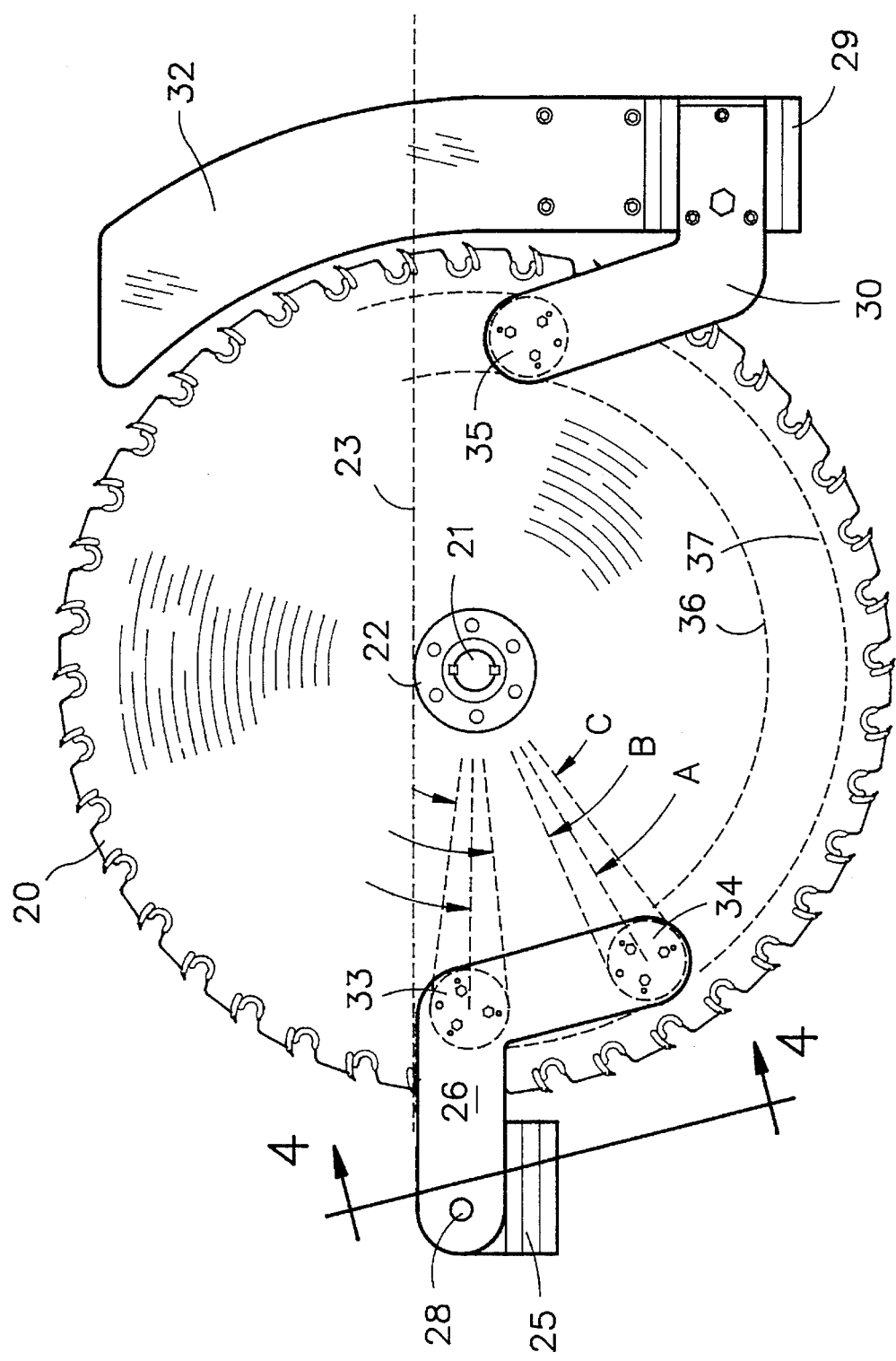
FIG. 2 is an elevation view of a saw showing the respective location of each pair of pads.
Figure 3:
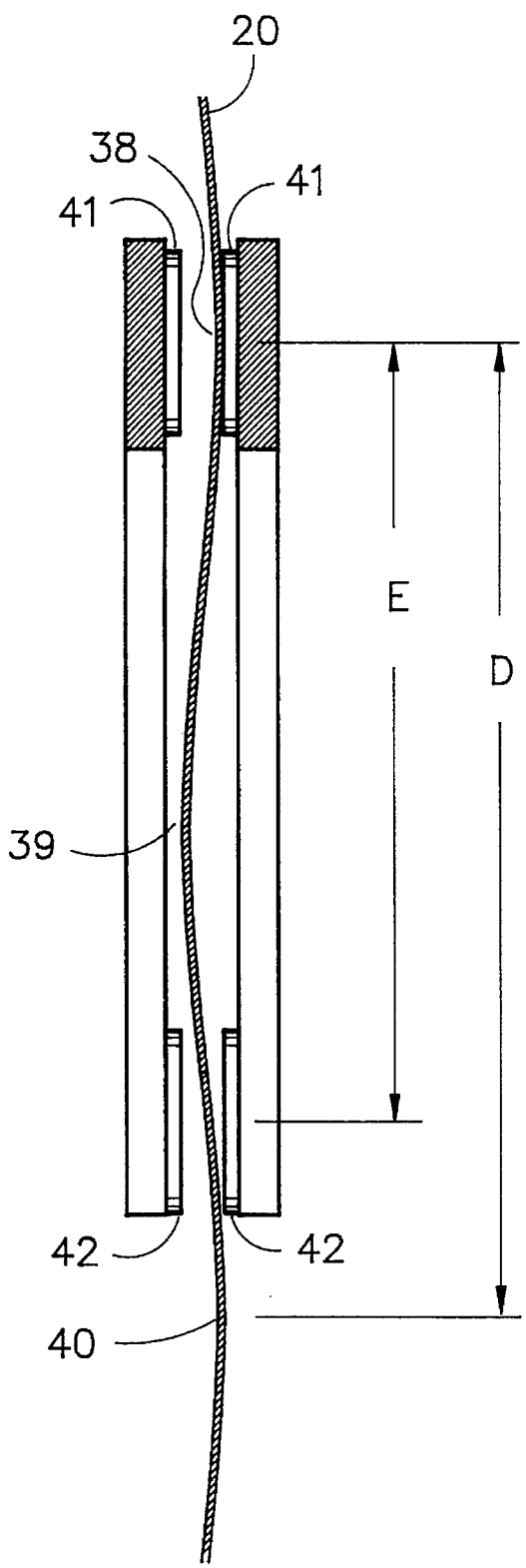
FIG. 3 is a cross section of the circular saw showing a typical sinusoidal wave within the saw blade, and a prior art guiding system.

From the illustration given in FIG. 2, one can better see the placement of front guiding pads 33, 34, and the rear guide pads 35, where all pads are shown in broken lines, at a same radial distance from the centre of the saw blade 20. The path of each pad follows between imaginary lines 36 and 37, so to establish a lubricated or otherwise, cleaned and smoothed pathway and to thereby minimize a friction on the surface of the saw.

A preferred placement of front upper pads 33 is horizontally in line with floating saw collar 22 such that arms 26, 27 are below a usable projection of the saw 20 defined by the portion above a horizontal line of cut 23 tangent to floating saw collar 22.

A preferred placement of rear pads 35 is in a relatively opposed segment of pads 33 and 34, and below the horizontal line of cut 23.

From the same FIG. 2, one can also understand, the spacing between the front upper pads 33, and the front lower pads 34 according to an angular spacing "A" on the saw blade 20.

The spacing "A" corresponds to half an angular wavelength of a sinusoidal wave, naturally occurring within a saw during sawing.

Figure 4:
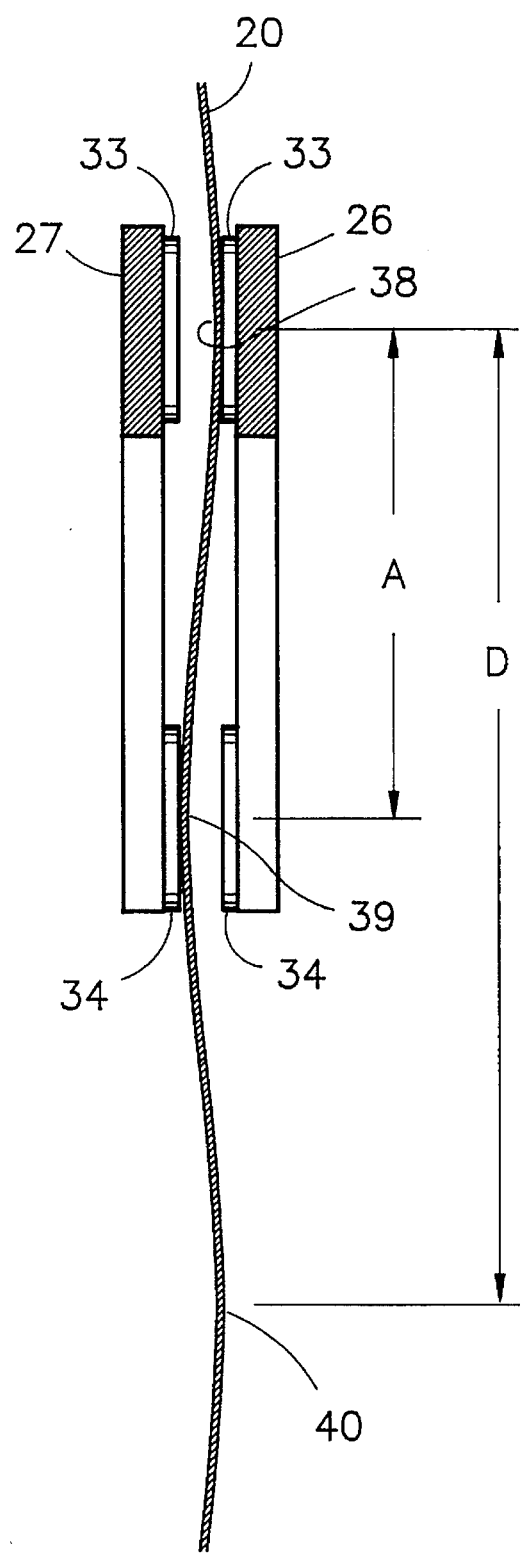
FIG. 4 is a cross section of the circular saw along line 4—4 of FIG. 2. The figure illustrates an ideal placement of guide pads on two successive and opposite peaks of a sinusoidal wave.

A typical sinusoidal wave within a saw 20 is shown in FIG. 4, where an angular wavelength is shown as "D" and half the angular wavelength is shown as "A".

A preferred method in defining an ideal spacing "A" is by measuring a circumferential vibration wave of the saw while sawing, and while turning freely after leaving a log. The measurement of such vibration wave can be done using a very well known art of vibration analysis. The method consists of placing a velocity or displacement pick-up, axially to the saw, as for example on the rear arm 30 or on the rear base 29, and by filtering the frequency of the circumferential vibration wave with an industrial vibration analyzer "to define a dominant vibration for each of", the two conditions stated above. Repeat measurements may be required to confirm consistency of readings.

The circumferential vibration wavefrequencies obtained are thereafter analyzed in relation to the rotational speed of the saw. As an example, a dominant frequency of 6 times the RPM of the saw will indicate 3 full angular wavelengths around the circumference of the saw. Each angular wavelength having a crest and a valley, or one can say two opposite peaks, each successive opposite peak touches in succession the right pad and the left pad, thereby showing 6 impacts per revolution.

The number of angular wavelengths in a saw usually reduces in number when the saw is sawing through the log. This is due to the reduction in speed of the saw during sawing, and to a substantial increase in circumferential tension applied by the teeth of the saw.

The number of angular wavelengths in a saw also depends upon the rotational speed of the saw and its natural frequency. Such natural frequency is related to its dimensions and material of construction.

Therefore it has been found that an 8 AWG thin kerf hardwood saw with replaceable carbide teeth, turning at 750 RPM, and having a diameter between 48" to 54" vibrates as follows:

During a Cut

7500 CPM=10 times RPM=5 angular wavelengths/turn

Running freely after a cut

9000 CPM=12 times RPM=6 angular wavelengths/turn and 10,500 CPM=14 times RPM=7 angular wavelengths/turn When dividing the circumference of a saw in 5, 6 or 7 segments, one finds that the angular wavelength varies from 51° to 72° per period. The angular distance from two opposing adjacent peaks, or half the angular wavelength, is therefore between 25° to 36°.

In this preferred embodiment, the guide pads 33, 34 are 4½" in diameter. When those pads are placed at an angular spacing "A" of 32° around a 48" diameter saw, the surface covered by these pads ranges from a minimum angular spacing "B" about 20° to a maximum angular spacing "C" of about 45°. Such a coverage ensures that opposite adjacent peaks from a vibration having 4 to 9 angular wavelengths per turn, are always contained simultaneously within front pads 33 and 34.

Therefore a front guide assembly having a pad spacing "A" of 32° satisfies a variety of sawing conditions for 8 AWG thin kerf saws having a diameter between 48" and 54".

Similarly, front arms 26, 27 can be manufactured to satisfy a natural vibration and rotational speed of most commonly used thin kerf and conventional circular saws. The proper front arms 26, 27 are then selected after a vibration analysis of the saw during the installation of the guiding system.

Referring to FIG. No. 3 and 4, a sinusoidal wave as those occurring around the circumference of a circular saw 20 is illustrated. The amplitude of the wave as well as the spacing of the guide pads 33, 34 have been exaggerated to facilitate a comprehension of the following teaching. A normal spacing of opposite pads 33, 34 or 35 is adjusted by leaving a gap between a pad surface and the nearest point on the surface of the saw 20. As an example, a recommended gap opening for hardwood saws having brazed-on carbide teeth is 0.030", and a recommended gap opening for hardwood saws having replaceable teeth is 0.045".

A length of an angular wavelength in a saw 20 is measured from two successive peaks on the same side of the saw; that is from peak 38 to peak 40, as shown as distance "D". An adjacent and opposite peak 39, or commonly referred to as a valley of a wave, is located at half the angular wavelength. A half angular wavelength is shown as distance "A".

In the prior art equipment using four front pads having a spacing of "E"=20" between the upper pads 41 and the lower pads 42, wherein a 48" saw vibrates at a rate of 5 to 6 angular wavelengths per turn, pad spacing "E" is much longer than half of angular wavelength "D". Therefore, "during a rotation of the saw," opposite peaks 38 and 39 will enter gaps between pads 41, 41 and between pads 42, in succession, with each pair of pad producing an axial impact on the saw, resulting in more vibration and wobbling than dampening.

In the preferred embodiment however, successive opposite peaks 38 and 39, enter into gaps between adjacent pads 33, 33 and between 34, 34 at the same time, resulting in two simultaneous, opposite and equal axial impacts., tending to straighten the wave, while maintaining an axial balance on the saw 20.

It can now be understood from the foregoing teaching that this strategic placement of the pairs of the pads 33 and 34 at an angular distance "A" equal to half the angular wavelength "D" of a vibration, produces better vibration dampening characteristics than a single point guiding system or than a wrongly placed double point guiding device.

Figure 5:
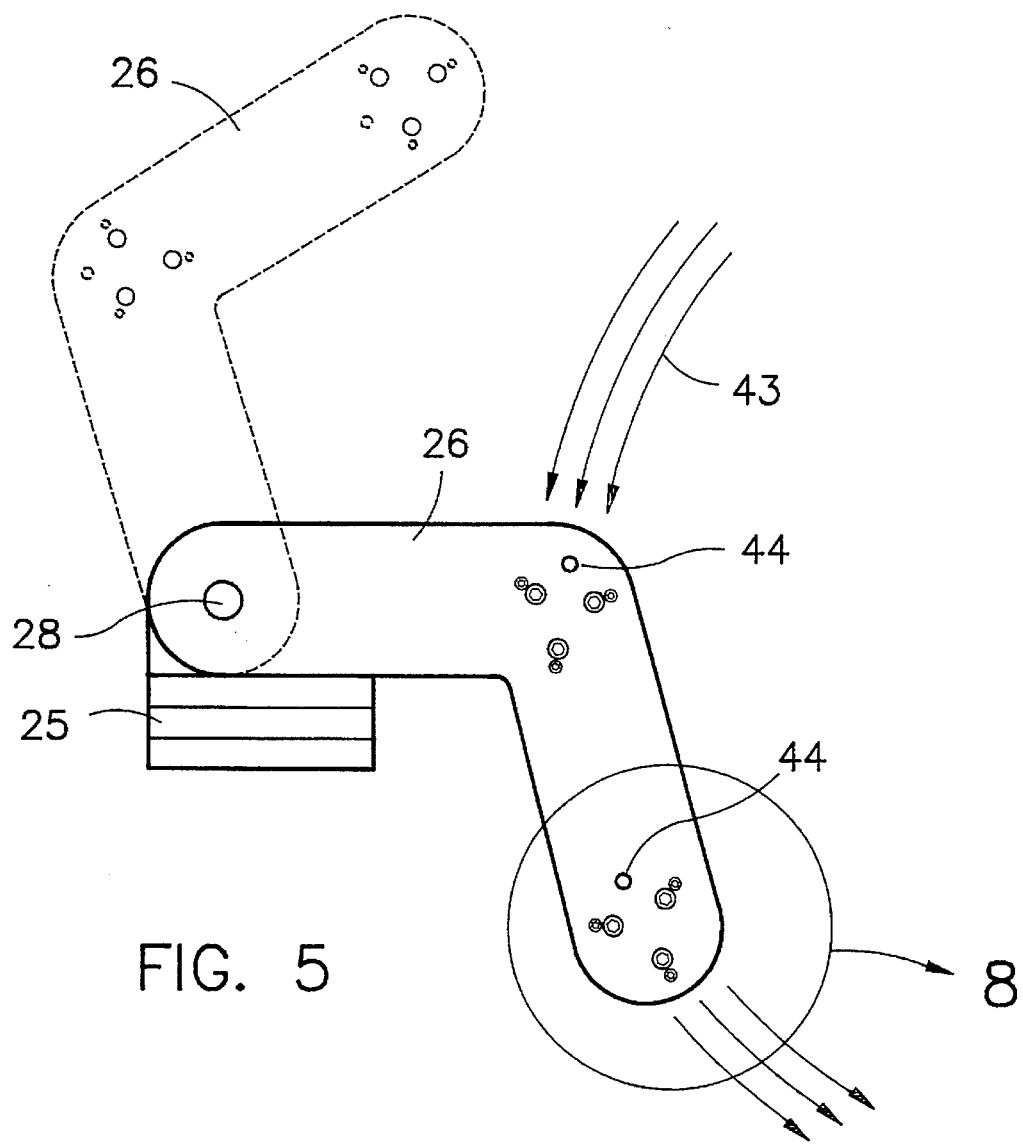
FIG. 5 shows a side view of one arm of the front guide. The figure illustrates a tilting of the front arm to replace a saw. Furthermore, the figure illustrates the orientation of a lubricating hole of each pad in relation to a movement of the saw.

Referring now to FIG. 5, the arm 26 can be pivoted upwardly about pin 28 to the upper position shown in broken lines. This feature is used to facilitate the changing of saws.

Figure 6:
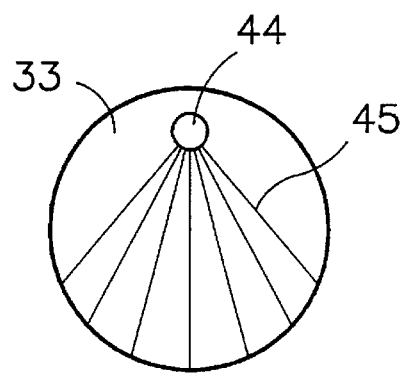
FIG. 6 is also a plan view of a guide pad, to illustrate a placement of a lubricating hole according to the present invention.
Figure 7:
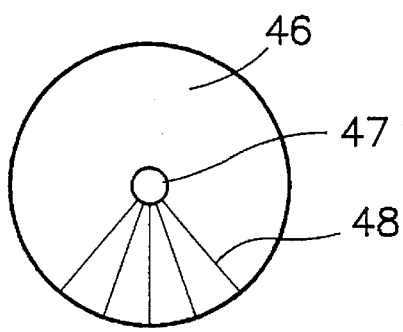
FIG. 7 is a plan view of a guide pad, to illustrate the prior art placement of a lubricating hole, and the distribution of the lubricant on the surface thereof.

The FIG. 5 further illustrates a preferred placement of lubrication hole 44, to feed lubricant to a guiding pad whenever a lubrication system is used. The direction of travel of the saw is shown by arcuate lines 43. The lubrication hole 44 to a pad is always placed near a side of entry of the pad by the saw, or in other words near the leading edge of the pad. The resulting lubricant distribution, shown by lines 45 on FIG. 6, covers a portion of about 55–60% of the total pad surface. As a comparison, a prior art pad 46 shown on FIG. 7, with a lubricant hole 47 located at the centre of the pad 46, has a lubricated surface shown between lines 48 of only 20–25% of the total pad surface. Such improved lubrication coverage extends the life of the pad while preventing uneven wear and hence, maintaining the pad in better contact with the surface of the saw blade.

Figures 8, 9, 10:
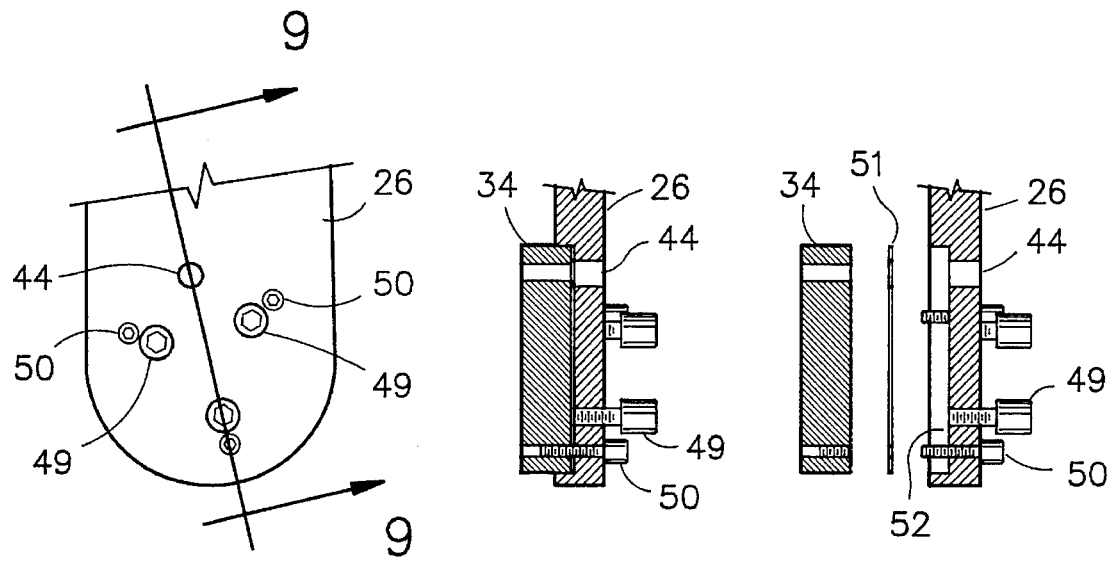
FIG. 8 is an enlarged view of an end of a front arm, shown as detail 8 on FIG. No. 5.
FIG. 9 is a cross section of a guiding pad at its mounting location on the front arm, along line 9—9 of FIG. No. 8.
FIG. 10 is an exploded view of the cross-section shown of FIG. 9.

Full contact of each pad with the saw blade is also provided from a multi-dimensional adjustment means on both the front and the rear guide assemblies. Such adjustment means is illustrated in FIGS. No. 8 to 14. Accordingly, a typical pad mounting is shown on FIGS. 8, 9, 10. The pad 34, made of a smooth wear resistant material, is retained within a recess 52 in front arm 26, by means of three retaining screws 50. A backing plate 51 is also contained within cavity 52, between pad 34 and the bottom of cavity 52.

A plane of pad 34 can be adjusted in spacial relationship to a plane of the saw by means of three levelling screws 49 spaced 120° apart. This 3-point leveller assembly is adjusted with retaining screws 50 in a loose mode. When proper alignment is obtained, retaining screws 50 are tightened, bringing pad 34 and backing plate 51 rigidly against levelling screws 49.

The steel backing plate 51 provides rigid contact for levelling screws 49, preventing thereby marking or otherwise penetrating the relatively soft surface of pad 34, and changing the alignment setting.

Figures 11, 12:
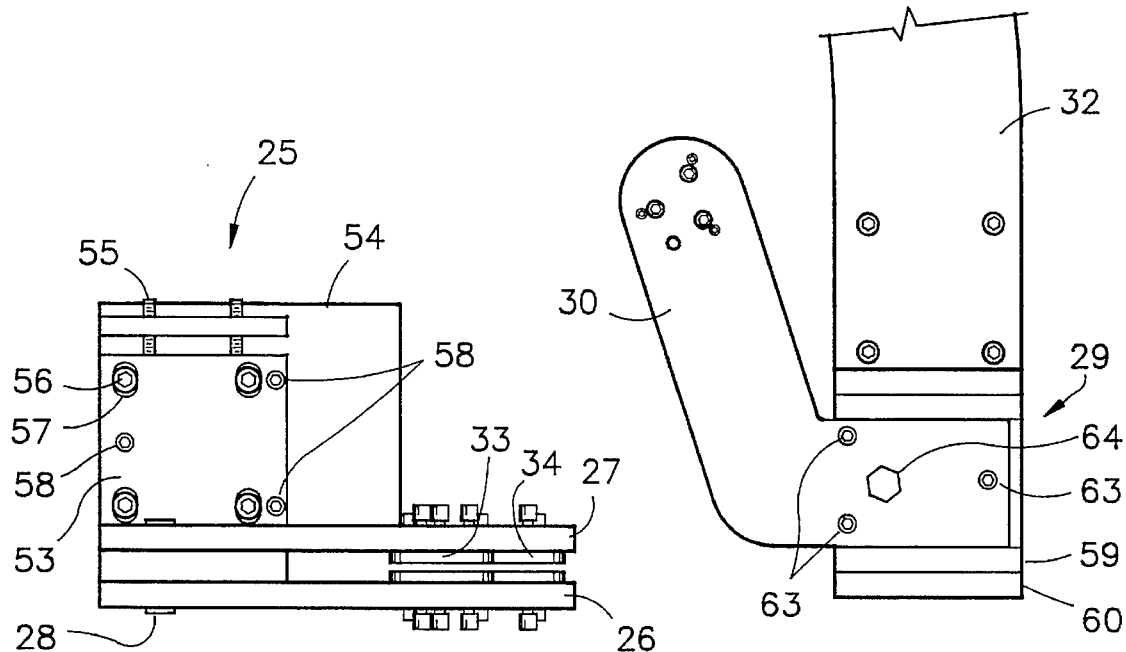
FIG. 11 is a plan view of a front guide assembly.
FIG. 12 is an elevation view of a rear guide assembly.
Figure 13:
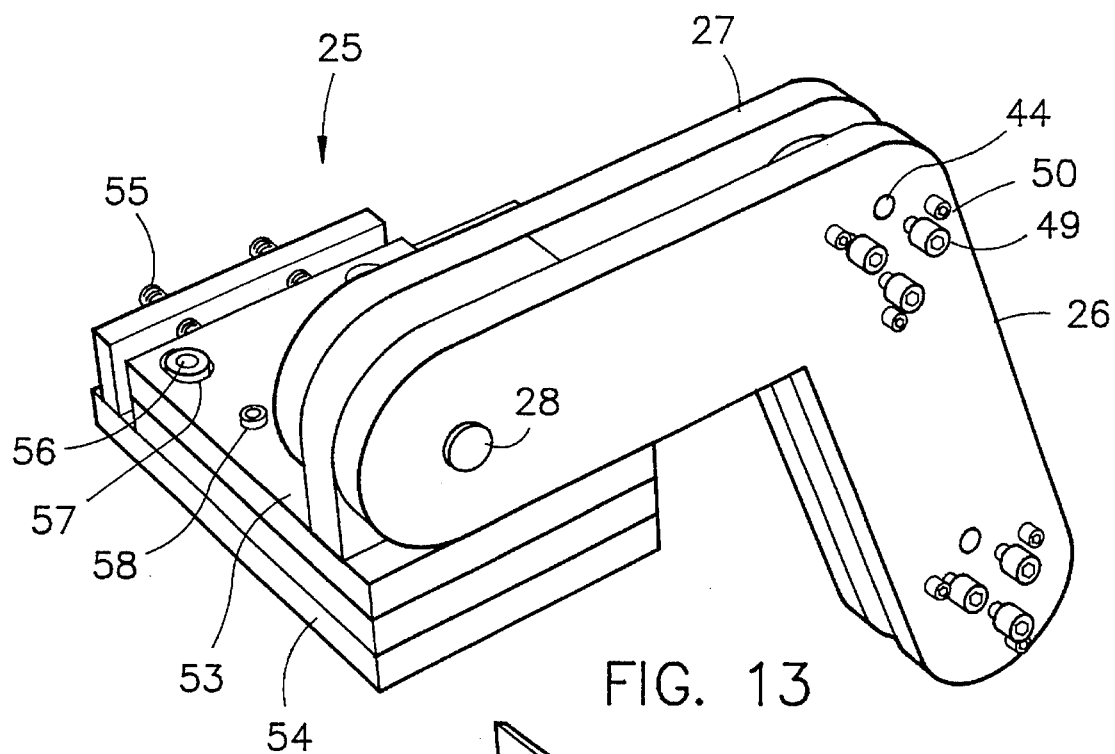
FIG. 13 is a perspective view of a front guide assembly.

The front base 25 of the guide system is adjustable laterally by means of a double base plate arrangement. Referring to FIGS. 11 and 13, a pair of lateral set screws 55 are used to precisely position the top plate 53 relative to a bottom mounting plate 54. The top plate 53 is held onto bottom plate 54 by means of four retaining screws 56 through countersunk slots 57 in plate 53.

The top plate 53 is also equipped with a 3-point leveller. Three levelling screws 58 disposed in a triangular configuration are used to adjust a plane of arms 26 and 27 to correspond to a plane of the saw 20. This adjustment is also done with retaining screws 56 in the loose mode. Once a satisfactory alignment is obtained, retaining screws 56 are tighten to retain such ideal alignment.

A combination of adjustment by lateral set screws 55 and by levelling screws 58 provide, a three dimensional positioning of arm 26 and 27 to compensate for an imperfect mounting of plate 54 onto an existing structure. The additional 3-point level let behind each pad 33 or 34 is additional adjustment to compensate for a lack of straightness of arm 26 or 27 or to accommodate for a conventional saw having a tapered cross section, such as the 6–7 AWG saw blade thickness described earlier.

Figure 14:
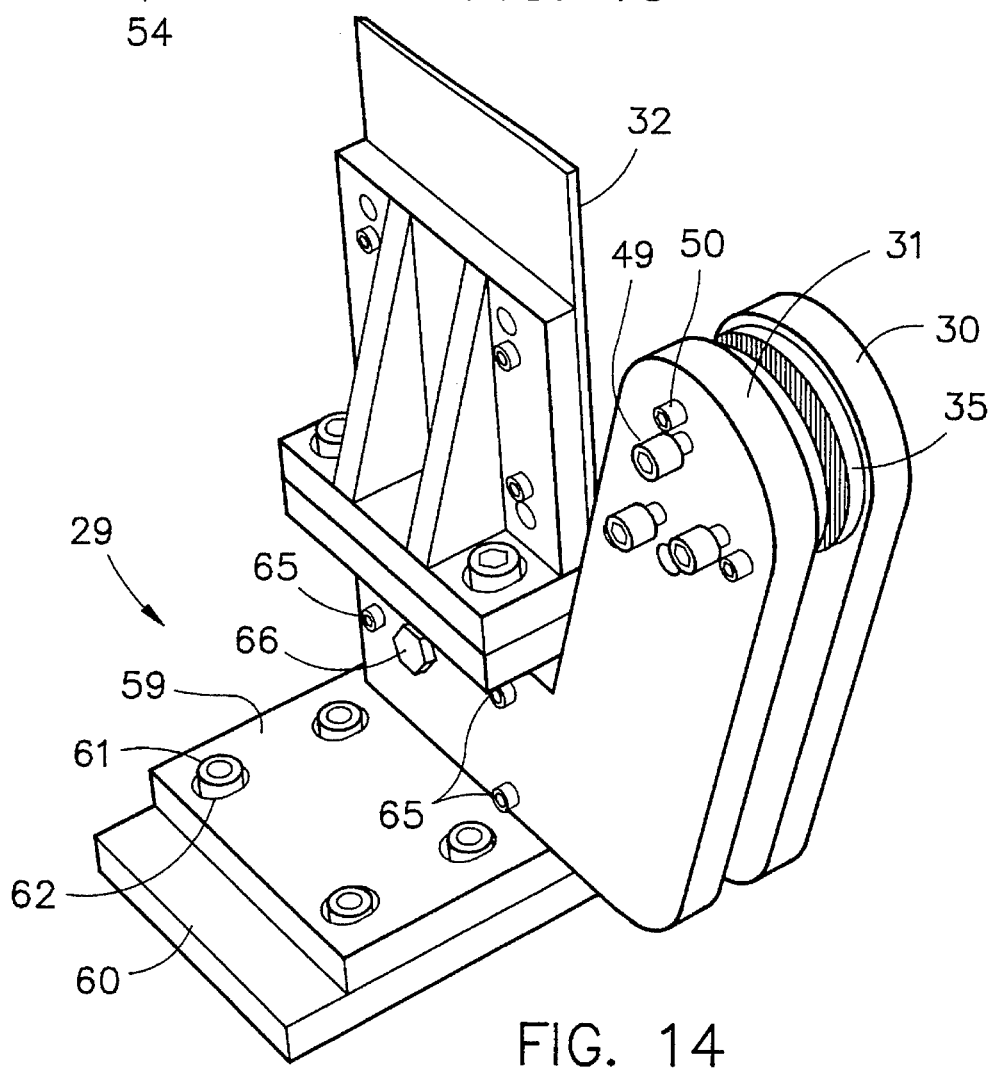
FIG. 14 is a perspective view of a rear guide assembly, showing the back part of the guide.

Referring now to FIG. 12 and 14, the rear base 29 is also adjustable laterally by sliding an upper plate 59 onto a lower mounting plate 60 and by tightening plate 59, by means of four retaining screws 61 within countersunk slots 62, onto mounting plate 60.

A plane of arm 30 or 31 is individually adjustable to a plane of the saw 20 by means of a 3-point level let on each arm 30, 31. Accordingly three levelling screws 63 on right arm 30, and three levelling screws 65 on left arm 31 are disposed in a triangular placement. Once a satisfactory adjustment is obtained, retaining screw 64 on right arm 30 and retaining screw 64 on left arm 31 are tightened to retain such alignment.

A combination of lateral movement of plate 59 on plate 60 with a three-dimensional positioning of arm 30 and arm 31 compensates for imperfect mounting of plate 60 on an existing structure. Similarly to the front arms, the 3-point levellers on rear pads 35 compensate for bent rear arms 30, 31 or to allow adjustment for a tapered saw.

Figure 15:
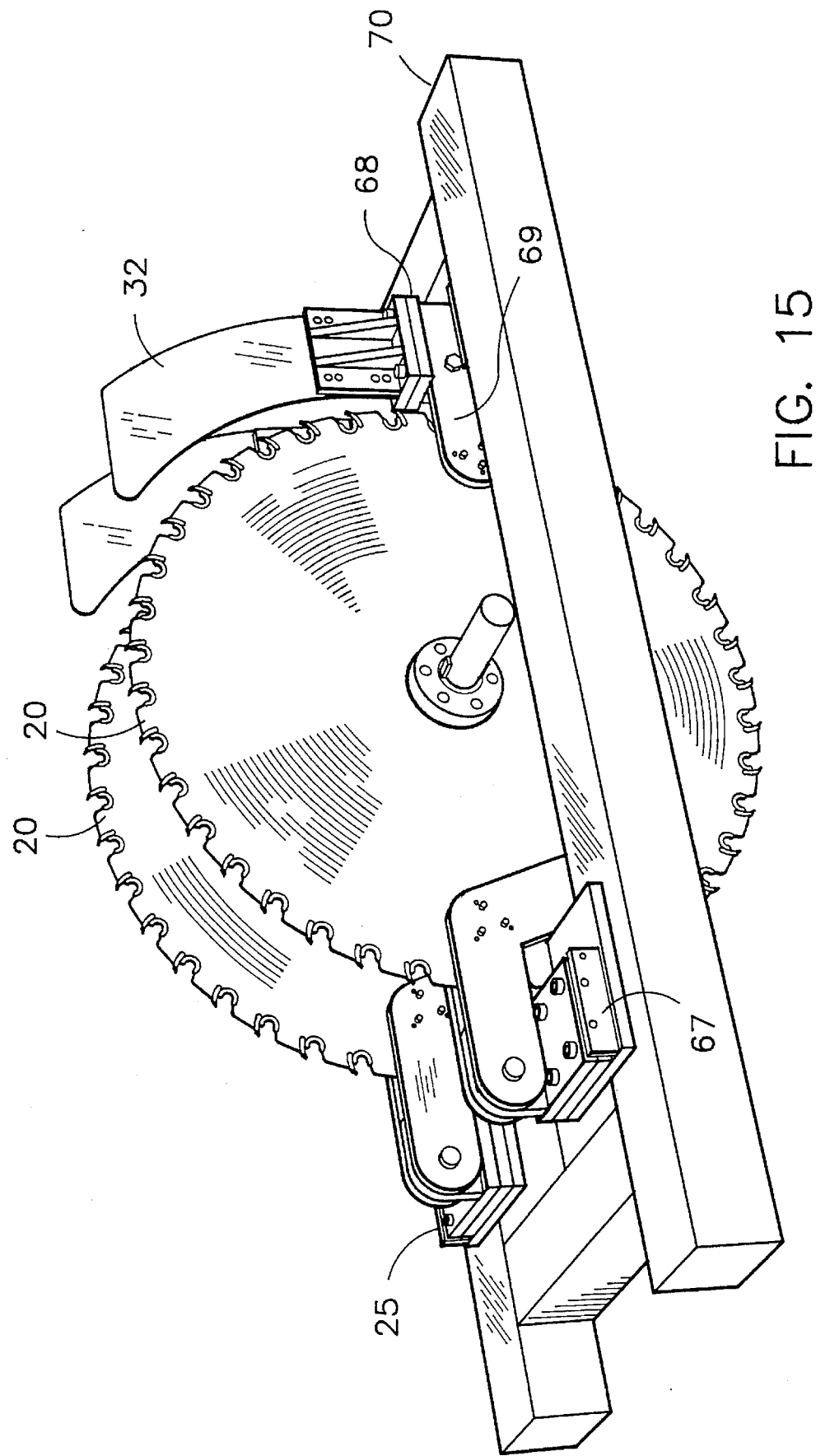
FIG. 15 is another preferred embodiment showing a front and a rear guide system adapted to a twin saw machine.

While a preferred embodiment has been described for a single circular saw, a mirror image 67 of front base 25 as shown of FIG. 15, and a modified rear base 68 with straight rear arm 69 can be manufactured to satisfy a twin saw machine, or to satisfy mounting structure 70 different from mounting structure 24.

Therefore the preferred embodiment of the invention as described herein is not limited thereto, and it will be apparent to those skilled in the art, that numerous modifications form part of the present invention insofar as they do not depart from the spirit, nature and scope of the claimed and described invention.

I claim:

1. A method for reducing a kerf width in a workpiece made by a circular saw blade, said circular saw blade being guided by at least two pairs of guide pads, each of said pairs of guide pads acting on said circular saw blade from opposite sides of the saw blade, said method comprising:

positioning each of said pairs of guide pads along an arc about a center of said circular saw blade and at an angular spacing therebetween equal to about half an angular wavelength of said circular saw blade at an operating speed.

2. The method for reducing a kerf width in a workpiece made by a circular saw blade as claimed in claim 1, comprising the following additional steps before positioning each of said pairs of guide pads:

determining a sawing frequency of the circular saw blade defined as the frequency of a dominant circumferential vibration wave of said saw blade when said saw blade is cutting said workpiece at said operating speed, and determining said angular wavelength of said circular saw blade as a function of said sawing frequency and the rotational speed of said saw blade at said operating speed.

3. The method for reducing a kerf width in a workpiece made by a circular saw blade as claimed in claim 1, comprising the following additional steps before positioning each of said pairs of guide pads:

determining a free-rotating frequency of the circular saw blade defined as the frequency of a dominant circumferential vibration wave of said saw blade when said saw blade is rotating freely at said operating speed, and determining said angular wavelength of said circular saw blade as a function of said free-rotating frequency and the rotational speed of said saw blade at said operating speed.

4. A method for reducing a kerf width in a workpiece made by a circular saw blade, said circular saw blade being guided by at least two pairs of guide pads, each of said pairs of guide pads acting on said circular saw blade from opposite sides of the saw blade, said method comprising:

determining a sawing frequency of the circular saw blade defined as the frequency of a dominant circumferential vibration wave of said saw blade when said saw blade is cutting said workpiece at a sawing operating speed, determining a free-rotating frequency of the circular saw blade defined as the frequency of a dominant circumferential vibration wave of said saw blade when said saw blade is rotating freely at a freely-rotating operating speed, determining a sawing angular wavelength of said circular saw blade as a function of said sawing frequency and the rotational speed of said saw blade at said sawing operating speed, determining a free-rotating angular wavelength of said circular saw blade as a function of said free-rotating frequency and the rotational speed of said saw blade at said freely-rotating operating speed, and determining a mean angular wavelength of said circular saw blade defined as the mean value between the sawing angular wavelength and the free-rotating angular wavelength, and positioning each of said pairs of guide pads along an arc about a center of said circular saw blade and at an angular spacing therebetween equal to about half the mean angular wavelength of said circular saw blade.

\* \* \* \* \*